US012625421B2

(12) United States Patent　　　　　　(10) Patent No.:　US 12,625,421 B2
Wakabayashi et al.　　　　　　　　　　(45) Date of Patent:　　　May 12, 2026

(54) PROJECTOR HAVING A MODULATED LIGHT REDUCTION RELAY LENS SYSTEM AND A CONTROL UNIT CORRECTING WHITE BALANCE BASED ON F-NUMBER

(71) Applicant: SEIKO EPSON CORPORATION, Tokyo (JP)

(72) Inventors: Junichi Wakabayashi, Matsumoto (JP); Hidefumi Sakata, Azumino (JP); Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 292 days.

(21) Appl. No.: 18/586,831

(22) Filed: Feb. 26, 2024

(65) Prior Publication Data

US 2024/0288759 A1　　Aug. 29, 2024

(30) Foreign Application Priority Data

Feb. 27, 2023　(JP) ................................. 2023-028142

(51) Int. Cl.
G03B 21/20　　　　(2006.01)

(52) U.S. Cl.
CPC ....... G03B 21/206 (2013.01); G03B 21/2013 (2013.01); G03B 21/204 (2013.01); G03B 21/2073 (2013.01)

(58) Field of Classification Search
CPC .............. G03B 21/206; G03B 21/2013; G03B 21/204; G03B 21/2073
See application file for complete search history.

(56) References Cited

U.S. PATENT DOCUMENTS

| | | | | |
|---|---|---|---|---|
| 6,634,755 | B1 * | 10/2003 | Okuyama | .............. G03B 21/26 |
| | | | | 349/8 |
| 6,676,260 | B2 * | 1/2004 | Cobb | ................... H04N 9/3105 |
| | | | | 349/5 |
| 6,808,269 | B2 * | 10/2004 | Cobb | ................... H04N 9/3105 |
| | | | | 349/5 |
| 7,159,988 | B2 | 1/2007 | Yatsu et al. | |

(Continued)

FOREIGN PATENT DOCUMENTS

| | | |
|---|---|---|
| JP | 2005-157153 A | 6/2005 |
| JP | 2005-345767 A | 12/2005 |

(Continued)

*Primary Examiner* — Bao-Luan Q Le
(74) *Attorney, Agent, or Firm* — Oliff PLC

(57) ABSTRACT

A projector includes a relay system reducing a luminous flux width of a first color light modulated by a first light modulation element, a light combining prism outputting a combined light formed by combining the first color light having the luminous flux width reduced by the relay system and another color light modulated by a second light modulation element, a projection system projecting the combined light as a projection image, a detection unit detecting an F-number of the projection system, and a control unit correcting a white balance of the projection image by controlling an amount of a light output from at least one of the first light modulation element and the second light modulation element based on the F-number detected by the detection unit. A pixel pitch of the first light modulation element is larger than a pixel pitch of the second light modulation element.

8 Claims, 6 Drawing Sheets

(56) References Cited

U.S. PATENT DOCUMENTS

| | | | | |
|---|---|---|---|---|
| 2003/0133079 A1* | 7/2003 | Cobb | .................... | H04N 9/3105 |
| | | | | 353/31 |
| 2003/0202159 A1* | 10/2003 | Cobb | .................... | H04N 9/3164 |
| | | | | 353/31 |
| 2023/0074488 A1 | 3/2023 | Wakabayashi | | |
| 2024/0319484 A1* | 9/2024 | Morikuni | ............ | G02B 17/008 |
| 2025/0310495 A1* | 10/2025 | Morikuni | ............ | H04N 9/3152 |

FOREIGN PATENT DOCUMENTS

| | | | |
|---|---|---|---|
| JP | 2006-330410 A | 12/2006 |
| JP | 2022-038106 A | 3/2022 |
| JP | 2023-037782 A | 3/2023 |

* cited by examiner

FIG. 4

PROJECTOR HAVING A MODULATED LIGHT REDUCTION RELAY LENS SYSTEM AND A CONTROL UNIT CORRECTING WHITE BALANCE BASED ON F-NUMBER

The present application is based on, and claims priority from JP Application Serial Number 2023-028142, filed Feb. 27, 2023, the disclosure of which is hereby incorporated by reference herein in its entirety.

BACKGROUND

1. Technical Field

The present disclosure relates to a projector.

2. Related Art

JP-A-2005-345767 discloses a projector in which an effective area of one light modulation element of a plurality of light modulation elements is larger than effective areas of the other light modulation elements. The projector of JP-A-2005-345767 includes a first modulation element modulating a blue light, a second modulation element modulating a green light, a third modulation element modulating a red light, a prism combining the respective modulated color lights, a prism combining the respective modulated color lights, a correction lens placed between the second modulation element and the prism, and a projection lens projecting the combined light output from the prism as a projection image on a projection surface. A light modulation area size of the second light modulation element is larger than light modulation area sizes of the first light modulation element and the third light modulation element. The correction lens reduces the luminous flux width output from the second modulation element to be the same as the luminous flux widths of the lights output from the first light modulation element and the third light modulation element. The prism outputs a combined light formed by combining the green light output from the second modulation element, the blue light output from the first modulation element, and the red light output from the third modulation element.

In the projector of JP-A-2005-345767, when the numbers of pixels of the first light modulation element, the second light modulation element, and the third light modulation element are the same, the light modulation area size of the second light modulation element is larger than the light modulation area sizes of the first light modulation element and the third light modulation element, and the pixel pitch of the second light modulation element is larger than the pixel pitches of the first light modulation element and the third light modulation element. As a result, the intensity distributions of the lights output from the first light modulation element and the third light modulation element are the same, however, the intensity distribution of the light output from the second light modulation element is different from the intensity distributions of the lights output from the first light modulation element and the third light modulation element because the degrees of influences by diffraction are different due to differences in pixel pitch. Thereby, when the combined light combined by the prism is projected as the projection image by the projection lens, there is a problem that a white balance of the projection image is not in a desired condition.

SUMMARY

In order to solve the above described problem, a projector according to an aspect of the present disclosure includes a light source unit outputting an output light containing a first color light and another color light having a longer wavelength range than the first color light, a first light modulation element irradiated with the first color light and modulating the first color light, a second light modulation element irradiated with the other color light and modulating the other color light, a relay system, with the first light modulation element placed on an enlargement-side imaging surface, reducing a luminous flux width of the first color light modulated by the first light modulation element on a reduction-side imaging surface, a light combining prism outputting a combined light formed by combining the first color light having the luminous flux width reduced by the relay system and the other color light modulated by the second light modulation element, a projection system projecting the combined light output from the light combining prism as a projection image, a detection unit detecting an F-number of the projection system, and a control unit correcting a white balance of the projection image by controlling an amount of a light output from at least one of the first light modulation element and the second light modulation element based on the F-number detected by the detection unit, wherein an effective area of the first light modulation element is larger than an effective area of the second light modulation element, and a pixel pitch of the first light modulation element is larger than a pixel pitch of the second light modulation element.

BRIEF DESCRIPTION OF THE DRAWINGS

FIG. 4 is a schematic diagram of a main part of a projector of Embodiment 2.

DESCRIPTION OF EMBODIMENTS

As below, projectors according to embodiments of the present disclosure will be explained with reference to the drawings.

Embodiment 1

Figure 1:
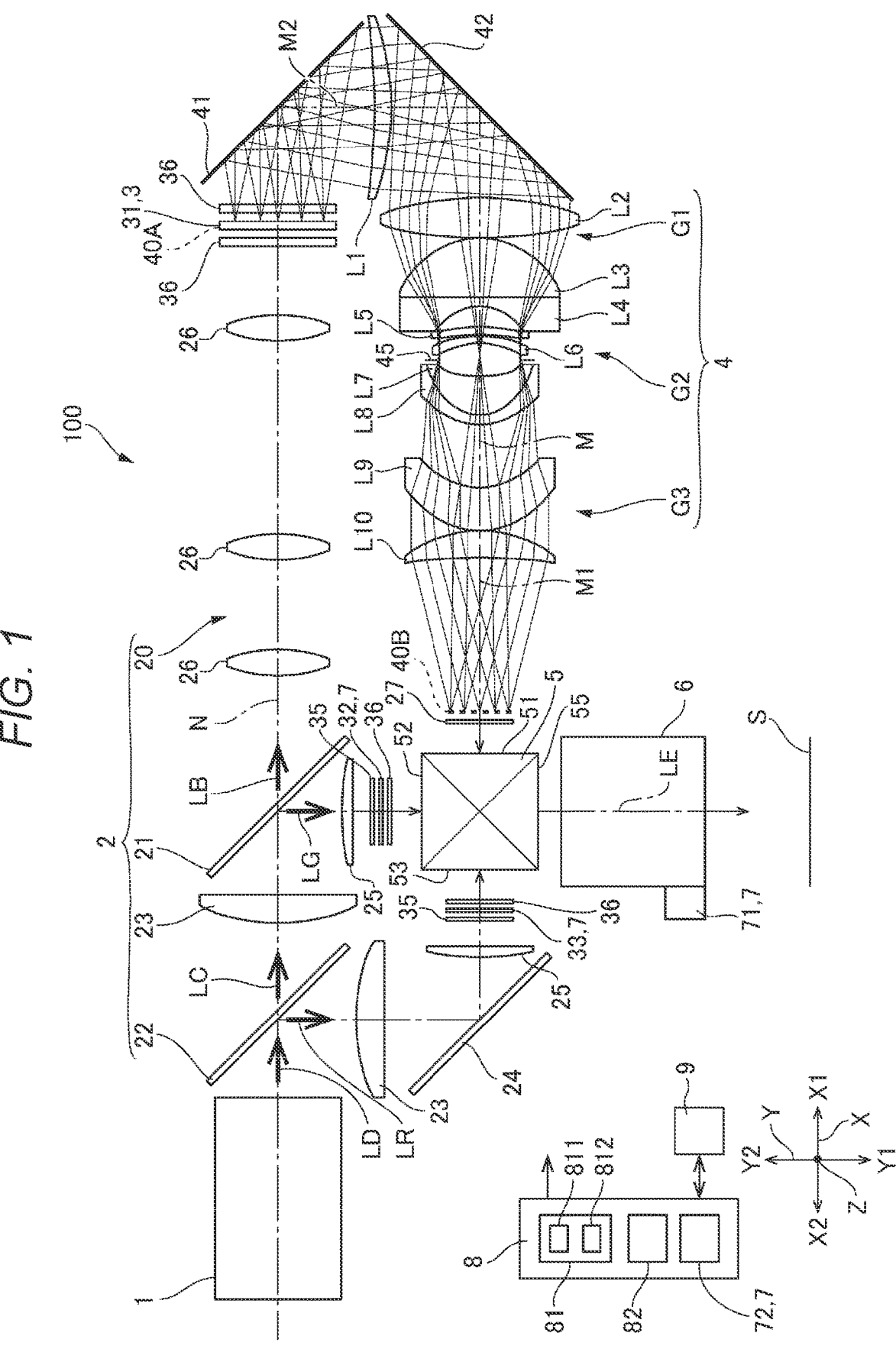
FIG. 1 is a schematic diagram of a main part of a projector of Embodiment 1.

FIG. 1 is a schematic diagram of a main part of a projector 100 of Embodiment 1. As shown in FIG. 1, the projector 100 includes a light source unit 1, a separation system 2 separating an output light LD output from the light source unit 1 into respective color lights, a plurality of light modulation elements 3 modulating the respective color lights separated by the separation system 2 and forming a projection image, a relay system 4 reducing a luminous flux width of the color light modulated by one of the plurality of light modulation elements 3, a light combining prism 5 outputting a combined light formed by combining the respective color lights modulated by the light modulation elements 3, a projection system 6 projecting the combined light output from the light combining prism 5 as a projection image, a detection unit 7 detecting an F-number of the projection system 6, a control unit 8, and a memory unit 9.

Figure 2:
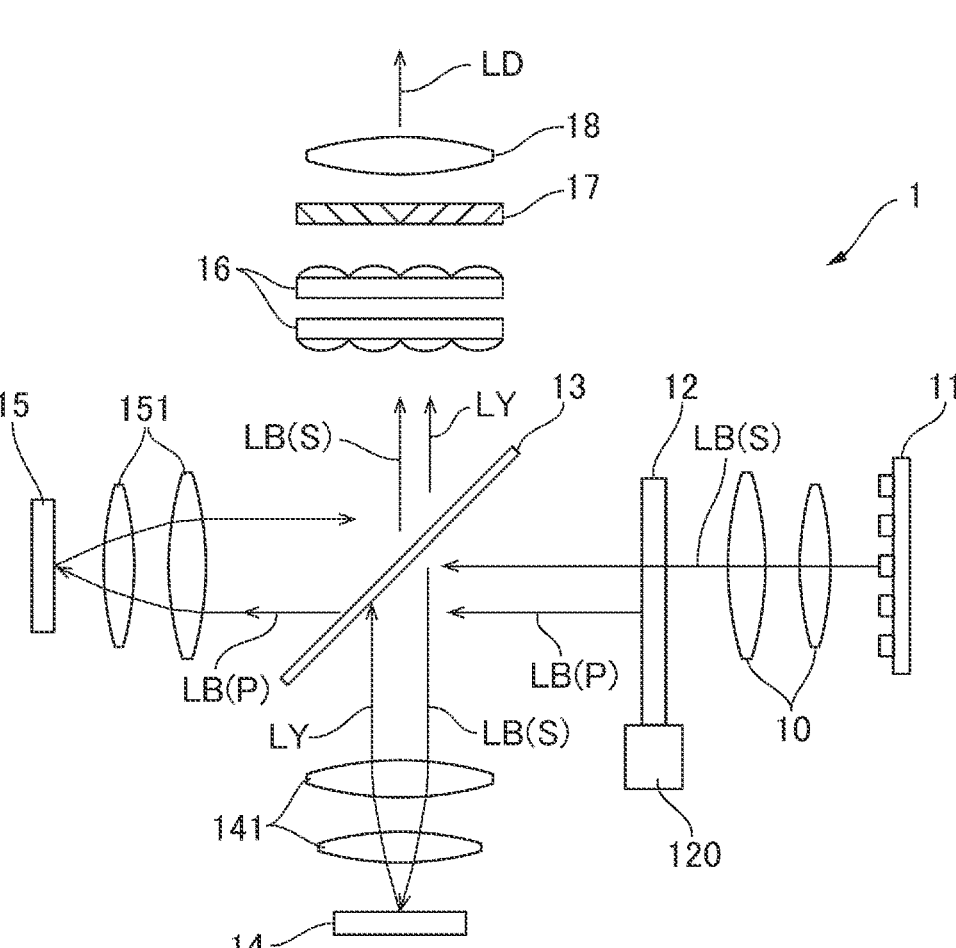
FIG. 2 is a schematic diagram of a light source unit of Embodiment 1.

Here, in the following description, for convenience, three axes orthogonal to one another are an X-axis, a Y-axis, and a Z-axis. Further, directions along a first optical axis N of the separation system 2 are X-axis directions. In the X-axis directions, a direction in which the output light LD output from the light source unit 1 is a first direction X1 and an opposite direction thereto is a second direction X2. In the Y-axis directions, a direction in which the combined light is output from the light combining prism 5 is a third direction Y1 and an opposite direction thereto is a fourth direction Y2.
Light Source Unit FIG. 2 is a schematic diagram of the light source unit 1 of Embodiment 1. The light source unit 1 outputs the output light LD containing a first color light and another color light having a longer wavelength range than the first color light. In the embodiment, the output light LD is a white light. As shown in FIG. 2, the light source unit 1 includes a light emitting element 11, lenses 10, a wave plate 12, a polarization separation element 13, a phosphor element 14, and a diffusion element 15. The light emitting element 11 is a laser diode array. The light emitting element 11 outputs a first color light LB in a first polarization state. In the embodiment, in the first polarization state, a light entering the polarization separation element 13 is an S-polarized light and the first color light LB is a blue light. The lenses 10 are placed between the light emitting element 11 and the wave plate 12. The lenses 10 form an afocal system. The wave plate 12 converts a part of the first color light LB output from the light emitting element 11 into a second polarization state. In the embodiment, the second polarization state is a P-polarized light. Accordingly, the wave plate 12 converts a part of the S-polarized first color light LB into the P-polarized first color light LB. Here, a rate at which the wave plate 12 converts the S-polarized light into the P-polarized light changes based on an angle of the wave plate 12 relative to the first color light LB entering the wave plate 12. In the embodiment, the angle of the wave plate 12 relative to the first color light LB entering the wave plate 12 is controlled by a motor 120. More specifically, the motor 120 can rotate the wave plate 12, the motor 120 rotates the wave plate 12, and thereby, the angle of the wave plate 12 relative to the first color light LB entering the wave plate 12 is controlled. As the wave plate 12, e.g., a half-wave plate may be used. The angle of the polarization direction may be converted according to an angle of a slow axis of the half-wave plate.

The polarization separation element 13 respectively separates the S-polarized first color light LB and the P-polarized first color light LB. The polarization separation element 13 reflects the S-polarized first color light LB and transmits the P-polarized first color light LB. The S-polarized first color light LB reflected by the polarization separation element 13 is transmitted through a pickup lens 141 and enters the phosphor element 14. The P-polarized first color light LB transmitted through the polarization separation element 13 is transmitted through a pickup lens 151 and enters the diffusion element 15.

The phosphor element 14 is excited by the first color light LB and converts the S-polarized first color light LB separated by the polarization separation element 13 into another color light LY having a longer wavelength range than the first color light LB and reflects the light. In the embodiment, the other color light LY is a yellow light. The other color light LY reflected by the phosphor element 14 is an unpolarized light not in a single polarization direction. The other color light LY reflected by the phosphor element 14 is transmitted through the pickup lens 141 and reaches the polarization separation element 13.

The diffusion element 15 diffusely reflects the P-polarized first color light LB separated by the polarization separation element 13. As the diffusion element 15, an element Lambertian-reflecting an incident light or the like is used. The first color light LB reflected by the diffusion element 15 is transmitted through the pickup lens 151 and reaches the polarization separation element 13.

The other color light LY reflected by the phosphor element 14 is transmitted through the polarization separation element 13. The first color light LB reflected by the diffusion element 15 is converted into the S-polarized light in the polarization separation element 13 and reflected by the polarization separation element 13. Thereby, the polarization separation element 13 outputs the first color light LB and the other color light LY in the same direction. That is, the polarization separation element 13 also functions as a combining element that combines the first color light LB and the other color light LY into the output light LD.

The light source unit 1 includes an optical integration system 16 dividing the output light LD output from the polarization separation element 13 into a plurality of luminous fluxes, a polarization conversion element 17 aligning the polarization direction of the output light LD output from the optical integration system 16, and a superimposing lens 18 outputting the output light LD output from the polarization conversion element 17 toward the separation system 2. The optical integration system 16 includes a plurality of lens arrays. The lens array has a plurality of micro-lenses arranged in an array form. The polarization conversion element 17 is an optical element formed using a PBS array. Though not illustrated, the polarization conversion element 17 has a polarization separation layer transmitting one linearly-polarized component of the polarization components contained in the output light LD output from the polarization separation element 13 without change and reflecting another linearly-polarized component in a direction perpendicular to the optical axis, a reflection layer reflecting the other linearly-polarized component reflected by the polarization separation layer in a direction parallel to the optical axis, and a retardation film converting the other linearly-polarized component reflected by the reflection layer into the one linearly-polarized component. The polarization conversion element 17 converts the polarization direction of the other color light LY as the unpolarized light and the polarization direction of the first color light LB as the S-polarized light into the P-polarized light or the S-polarized light.

Here, in the light source unit 1, a ratio of an amount of the S-polarized first color light LB reaching the phosphor element 14 and an amount of the P-polarized first color light LB reaching the diffusion element 15 may be changed by the control of the angle of the wave plate 12 using the motor 120, and thereby, a ratio of the amount of the first color light LB output from the diffusion element 15 and the amount of the other color light LY output from the phosphor element 14 can be adjusted. That is, in the light source unit 1, a ratio of the amounts of the first color light LB and the other color light LY contained in the output light LD can be adjusted by the control of the angle of the wave plate 12 using the motor 120.
Separation System The separation system 2 includes a second dichroic mirror 22, a first dichroic mirror 21, and an extension system 20 sequentially toward the first direction X1. The second dichroic mirror 22, the first dichroic mirror 21, and the extension system 20 are arranged along the first optical axis N of the separation system 2. The second dichroic mirror 22 separates the output light LD into a third color light LR and a mixed light LC. The second dichroic mirror 22 reflects the third color light LR in the third direction Y1 and transmits the mixed light LC toward the first direction X1. The first dichroic mirror 21 separates the mixed light LC into the first color light LB and a second color light LG. The first dichroic mirror 21 reflects the second color light LG in the third direction Y1 and transmits the first color light LB toward the first direction X1. The first color light LB has a first wavelength range containing a blue light. The second color light LG has a second wavelength range containing a green light. The third color light LR has a third wavelength range containing a red light. The first wavelength range is e.g., from 420 nm to 500 nm. The second wavelength range is e.g., from 500 nm to 600 nm. The third wavelength range is e.g., from 600 nm to 680 nm. The wavelength range of the mixed light LC is e.g., from 420 nm to 600 nm. In the embodiment, the first color light LB is the blue light. The second color light LG is the green light. The third color light LR is the red light.

The extension system 20 extends an optical path of the separation system 2 in the first direction X1. The extension system 20 includes a plurality of lenses 26. The plurality of lenses 26 are arranged along the first optical axis N of the separation system 2. The extension system 20 is placed between the first dichroic mirror 21 and a first light modulation element 31, which will be described later.

Here, in the third direction Y1 of the second dichroic mirror 22, a reflection mirror 24 reflecting the third color light LR separated by the second dichroic mirror 22 toward the first direction X1 is placed. The lenses 23 are respectively placed between the second dichroic mirror 22 and the reflection mirror 24 and between the second dichroic mirror 22 and the first dichroic mirror 21. The lenses 25 are respectively placed in the first direction X1 of the reflection mirror 24 and the third direction Y1 of the first dichroic mirror 21. The lenses 23 and the lenses 25 collect the second color light LG and the third color light LR near the light modulation elements 3.

Light Modulation Element

The light modulation elements 3 are liquid crystal panels. The light modulation elements 3 include the first light modulation element 31 irradiated with the first color light LB and modulating the first color light LB, a third light modulation element 32 irradiated with the second color light LG and modulating the second color light LG, and a fourth light modulation element 33 irradiated with the third color light LR and modulating the third color light LR. Each of the first light modulation element 31, the third light modulation element 32, and the fourth light modulation element 33 has a light incident-side polarizer 35 and a light exiting-side polarizer 36. Note that the third light modulation element 32 and the fourth light modulation element 33 correspond to "second light modulation element" of the present disclosure.

The first light modulation element 31 is placed in the first direction X1 of the extension system 20 on the first optical axis N. The third light modulation element 32 is placed in a position facing a second face portion 52 of the light combining prism 5. The fourth light modulation element 33 is placed in a position facing a third face portion 53 of the light combining prism 5.

An effective area of the first light modulation element 31 is larger than effective areas of the third light modulation element 32 and the fourth light modulation element 33.

Here, the effective area refers to an area of an effective display area of the light modulation element. In the embodiment, the first light modulation element 31 is a liquid crystal panel having a diagonal dimension of the effective display area of 1.03 inches, and the third light modulation element 32 and the fourth light modulation element 33 are liquid crystal panels having diagonal dimensions of the effective display areas of 0.67 inches. The respective numbers of pixels of the first light modulation element 31, the third light modulation element 32, and the fourth light modulation element 33 are the same. For example, the numbers of pixels of the first light modulation element 31, the third light modulation element 32, and the fourth light modulation element 33 are WUXGA (1920×1200). Accordingly, a pixel pitch of the first light modulation element 31 is different from pixel pitches of the third light modulation element 32 and the fourth light modulation element 33. More specifically, the pixel pitch of the first light modulation element 31 is larger than the pixel pitches of the third light modulation element 32 and the fourth light modulation element 33. Here, the pixel pitch shown in the specification refers to a dimension of one side of a pixel.

Relay System

In the relay system 4, the first light modulation element 31 is placed on an enlargement-side imaging surface 40A of the relay system 4 and the luminous flux width of the first color light LB modulated by the first light modulation element 31 is reduced on a reduction-side imaging surface 40B. That is, the relay system 4 is a scaling optical system. In the embodiment, the relay system 4 reduces a luminous flux width of 1.03 inches of the first color light LB modulated by the first light modulation element 31 to a luminous flux width of 0.67 inches on the reduction-side imaging surface 40B. The reduction-side imaging surface 40B is placed in a position facing a first face portion 51 of the light combining prism 5. A distance between the reduction-side imaging surface 40B and the first face portion 51 of the light combining prism 5 is the same as a distance between the third light modulation element 32 and the second face portion 52 of the light combining prism 5. Further, a distance between the reduction-side imaging surface 40B and the first face portion 51 of the light combining prism 5 is the same as a distance between the fourth light modulation element 33 and the third face portion 53 of the light combining prism 5.

Here, the projector 100 has a polarizer 27 placed between the reduction-side imaging surface 40B and the first face portion 51. The polarizer 27 and the light exiting-side polarizer 36 of the first light modulation element 31 transmit linearly-polarized components in the same direction of the polarization components contained in the first color light LB. That is, when the light exiting-side polarizer 36 of the first light modulation element 31 transmits the S-polarized first color light LB, the polarizer 27 transmits the S-polarized light and, when the light exiting-side polarizer 36 of the first light modulation element 31 transmits the P-polarized first color light LB, the polarizer 27 transmits the P-polarized light.

The relay system 4 includes a first lens group G1 having positive power with a plurality of lenses, a second lens group G2 having negative power with one or two lenses including at least one negative lens, and a third lens group G3 having positive power with a plurality of lenses sequentially from the enlargement side toward the reduction side. The relay system 4 includes a diaphragm 45 between the second lens group G2 and the third lens group G3. The first lens group G1, the second lens group G2, and the third lens group G3 are arranged along a second optical axis M of the relay system 4.

The number of lenses of the first lens group G1 and the number of lenses of the third lens group G3 are the same. More specifically, the first lens group G1 includes four lenses of a lens L1 to a lens L4. The third lens group G3 includes four lenses of a lens L7 to a lens L10.

The second lens group G2 includes two lenses of a lens L5 and a lens L6. At least one of the lens L5 and the lens L6 is a negative lens. The lens L2 to lens L10 are placed in one portion M1 extending in the X-axis directions of the second optical axis M. The lens L1 is placed in another portion M2 extending in the Y-axis directions of the second optical axis M.

The relay system 4 includes a first reflection mirror 41 reflecting the first color light LB modulated by the first light modulation element 31 in the third direction Y1 and a second reflection mirror 42 reflecting the first color light LB reflected by the first reflection mirror 41 in the second direction X2. The first reflection mirror 41 is placed in the fourth direction Y2 of the lens L1. The second reflection mirror 42 is placed between the lens L1 and the lens L2.

Light Combining Prism

The light combining prism 5 includes the first face portion 51 entered by the first color light LB, the second face portion 52 entered by the second color light LG, the third face portion 53 entered by the third color light LR, and a fourth face portion 54 outputting a combined light LE. The first face portion 51 and the third face portion 53 face each other in the X-axis directions. The second face portion 52 and the fourth face portion 54 face each other in the Y-axis directions. The light combining prism 5 outputs the combined light LE formed by combining the first color light LB having the luminous flux width reduced by the relay system 4, the second color light LG modulated by the third light modulation element 32, and the third color light LR modulated by the fourth light modulation element 33 from the fourth face portion 54 in the third direction Y1. Here, the luminous flux width of the first color light LB entering the first face portion 51 of the light combining prism 5 is the same as the luminous flux widths of the second color light LG entering the second face portion 52 of the light combining prism 5 and the third color light LR entering the third face portion 53 of the light combining prism 5.

Projection System

The projection system 6 projects the combined light LE output from the light combining prism 5 as a projection image on a screen S (projection surface). The projection system 6 includes a plurality of lenses. In the embodiment, the projection system 6 is a zoom lens. The projection system 6 varies a projection distance by rotating a zoom ring. The F-number of the projection system 6 is changed based on the projection distance.

Detection Unit

The detection unit 7 detects the F-number of the projection system 6. In the embodiment, the detection unit 7 detects the F-number based on the projection distance of the projection system 6. For example, the detection unit 7 detects the F-number at each time when the projection distance of the projection system 6 is changed. Note that the detection unit 7 may detect the F-number based on a plurality of projection positions including three locations of a wide-angle end, a middle position, and a telescopic end of the projection system 6.

The detection unit 7 includes a zoom position detection section 71 detecting a zoom position based on the projection distance and an output section 72 outputting the F-number corresponding to the zoom position detected by the zoom position detection section 71 from F-number information corresponding to zoom positions stored in the memory unit 9. The zoom position detection section 71 is e.g., an angle sensor, an encoder, a resistance position detection sensor, or the like. The output section 72 is provided in the control unit 8.

Memory Unit

In the memory unit 9, information of the F-numbers corresponding to the zoom positions based on the projection distances and angles of the wave plate 12 corresponding to the F-numbers is stored. In the embodiment, the control unit 8 controls the motor 120 to rotate the wave plate 12 based on the information of the angle of the wave plate 12 corresponding to the F-number.

Control Unit

The control unit 8 includes a light source drive section 81 controlling the output light LD output from the light source unit 1, a display drive section 82 operating the light modulation elements 3, and the output section 72. The display drive section 82 operates the light modulation elements 3 based on an external image signal such as a video signal.

The light source drive section 81 includes a power drive portion 811 and a light source adjustment portion 812. The power drive portion 811 controls the output light LD output from the light emitting element 11 based on an external image signal such as a video signal. The light source adjustment portion 812 corrects a white balance of the projection image on the screen S based on the F-number output by the output section 72. More specifically, the light source adjustment portion 812 controls the angle of the wave plate 12 using the motor 120 based on the information of the angle of the wave plate 12 corresponding to the F-number output by the output section 72 from the information of angles of the wave plate 12 corresponding to the F-numbers stored in the memory unit 9, and thereby, adjusts the ratio of the amounts of the first color light LB and the other color light LY contained in the output light LD and controls the amounts of the lights output from the first light modulation element 31, the third light modulation element 32, and the fourth light modulation element 33. Thereby, the light source adjustment portion 812 corrects the white balance of the projection image on the screen S.

White Balance Correction

Figure 3:
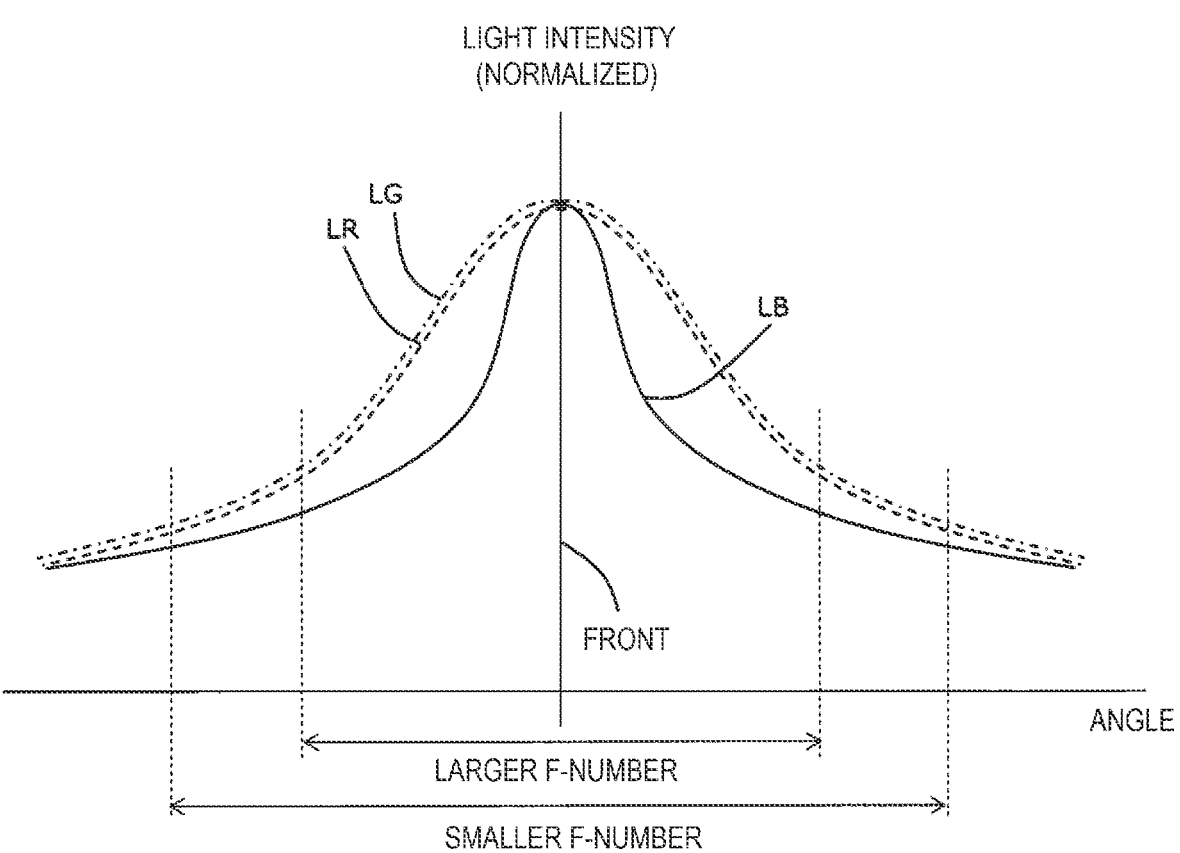
FIG. 3 shows an example of light intensity distributions of a first color light, a second color light, and a third color light entering a light combining prism.

The white balance correction of the projector 100 is explained. FIG. 3 shows an example of light intensity distributions of the first color light LB, the second color light LG, and the third color light LR entering the light combining prism 5. Note that the intensity distributions of the first color light LB, the second color light LG, and the third color light LR shown in FIG. 3 are formed by normalization with reference to amounts of lights in directions along the optical axes of the respective light modulation elements.

As shown in FIG. 3, the pixel pitches of the third light modulation element 32 and the fourth light modulation element 33 are the same, and the light intensity distributions of the second color light LG and the third color light LR have substantially the same shapes. On the other hand, the pixel pitch of the first light modulation element 31 is larger than the pixel pitches of the third light modulation element 32 and the fourth light modulation element 33, and the first color light LB is less affected by diffraction of the pixel pitch and has a smaller diffraction angle than the second color light LG and the third color light LR. As shown in FIG. 3, compared to the light intensity distributions of the second color light LG and the third color light LR, even when the transmission angle of the light used in the projection system 6 becomes wider, the light intensity distribution of the first color light LB changes less from the maximum value. Accordingly, the light intensity distribution of the first color light LB entering the light combining prism 5 is different from the light intensity distributions of the second color light LG and the third color light LR entering the light combining prism 5, and, when the combined light LE combined by the light combining prism 5 is projected as the projection image on the screen S by the projection system 6, the white balance of the projection image on the screen S changes based on the F-number of the projection system 6. For example, in the case of the light intensity distributions shown in FIG. 3, when the F-number is smaller, the transmission angle range of the light used in the projection system 6 is larger and the ratio of the amounts of the second color light LG and the third color light LR becomes relatively large to the first color light LB, and the projection image on the screen S becomes a highly yellowish projection image. When the F-number is larger, the transmission angle range of the light used in the projection system 6 is smaller and the ratio of the amount of the first color light LB becomes relatively large to the second color light LG and the third color light LR, and the projection image on the screen S becomes a highly bluish projection image. Accordingly, for the white balance correction of the projection image on the screen S, it is necessary to adjust at least one amount of light of the amounts of the first color light LB, the second color light LG, and the third color light LR entering the light combining prism 5.

Therefore, in the projector 100 of the embodiment, when the detection unit 7 senses the F-number of the projection system 6, the light source adjustment portion 812 controls the motor 120 to rotate the wave plate 12 based on the information of the angle of the wave plate 12 corresponding to the F-number detected by the detection unit 7 from the information of angles of the wave plate 12 corresponding to the F-numbers stored in the memory unit 9. Thereby, the output light LD with the adjusted ratio of the amounts of the first color light LB and the other color light LY is output from the light source unit 1.

The output light LD output from the light source unit 1 is separated into the first color light LB, the second color light LG, and the third color light LR by the separation system 2. The separated first color light LB, second color light LG, and third color light LR respectively enter the light modulation elements 3. Here, the ratio of the amounts of the first color light LB, the second color light LG, and the third color light LR entering the light modulation elements 3 is adjusted by the light source adjustment portion 812, and the amounts of the lights output from the first light modulation element 31, the third light modulation element 32, and the fourth light modulation element 33 are appropriately controlled based on the F-number. Thereby, the white balance of the projection image on the screen S is appropriately corrected based on the F-number of the projection system 6.

Functions and Effects

According to the projector 100 of the embodiment, the light source adjustment portion 812 controls the angle of the wave plate 12 using the motor 120 based on the information of the angle of the wave plate 12 corresponding to the F-number output by the output section 72 from the information of angles of the wave plate 12 corresponding to the F-numbers stored in the memory unit 9, and thereby, adjusts the ratio of the amounts of the first color light LB and the other color light LY contained in the output light LD and controls the amounts of the lights output from the first light modulation element 31, the third light modulation element

32, and the fourth light modulation element 33. Thereby, the light source adjustment portion 812 can correct the white balance of the projection image on the screen S. As a result, the projector 100 may project the projection image with the desired white balance on the screen S.

In the embodiment, the projection system 6 is the zoom lens. The detection unit 7 detects the F-number based on the projection distance of the projection system 6. Even when the projection distance of the projection system is changed, the projector 100 may appropriately correct the white balance of the projection image on the screen S based on the F-number of the projection system 6.

Embodiment 2

Figure 4:
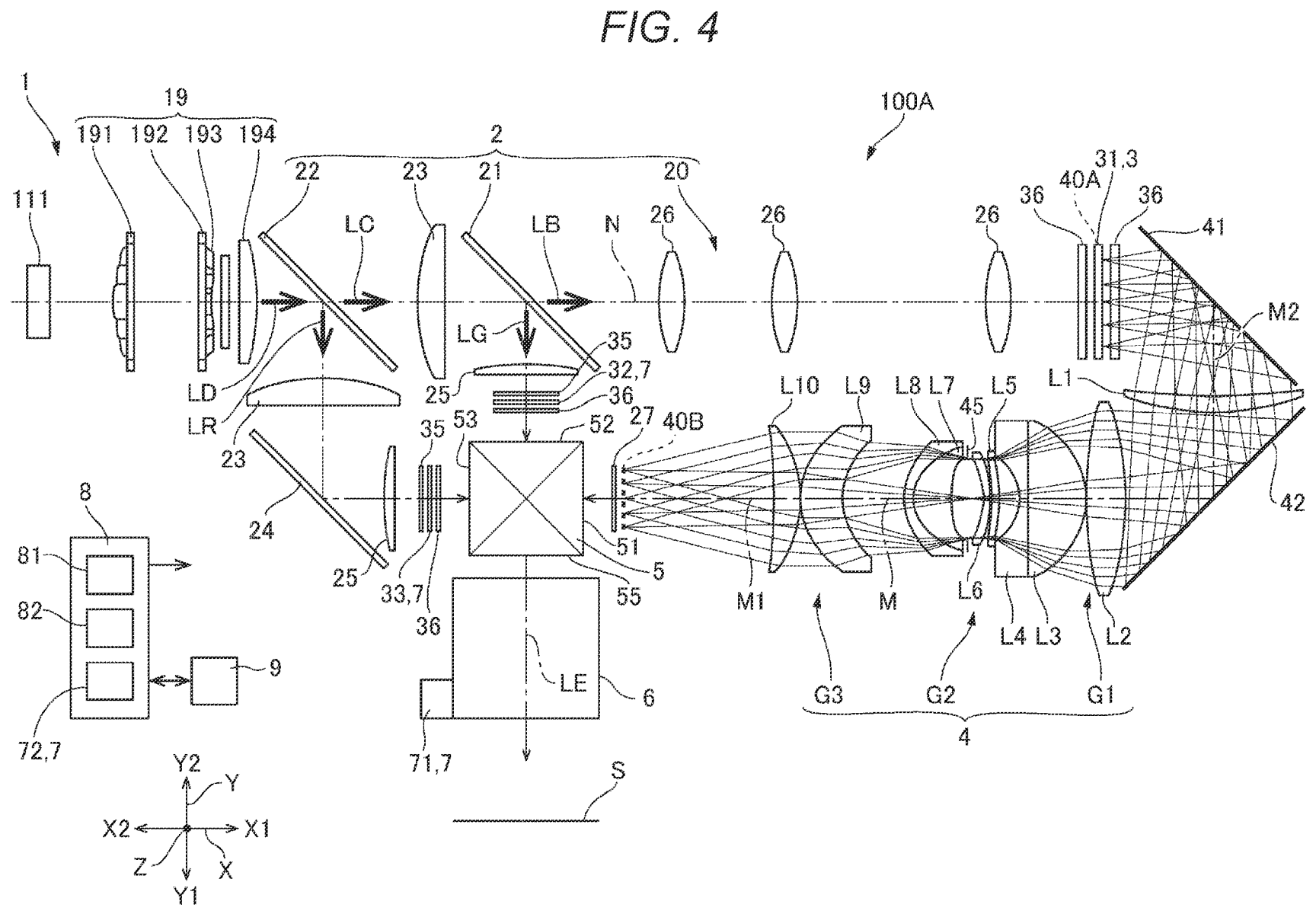

FIG. 4 is a schematic diagram of a main part of a projector 100A of Embodiment 2. The projector 100A of Embodiment 2 is different from the projector 100 of Embodiment 1 in the configurations of the light source unit 1 and the control unit 8. Accordingly, in Embodiment 2, the same configurations as those of Embodiment 1 have the same signs and the explanation thereof may be omitted.

The light source unit 1 outputs the output light LD containing a first color light and another color light having a longer wavelength range than the first color light. As shown in FIG. 4, the light source unit 1 includes a light emitting section 111 and an illumination system 19. The light emitting section 111 includes e.g., a super high-pressure mercury lamp, a solid-state light source, or the like. The light emitting section 111 outputs the output light LD. In the embodiment, the output light LD is a white light. The first color light is a blue light and the other color lights are a green light and a red light. The amounts of the blue light, the green light, and the red light contained in the output light LD are equal.

The illumination system 19 includes a multi-lens 191, a polarization beam splitter 192, a multi-lens 193, and a relay lens 194. The multi-lens 191 divides the output light LD output from the light emitting section 111 into a plurality of pieces. The polarization beam splitter 192 converts the polarization direction of the output light LD output from the multi-lens 191. The multi-lens 193 collects the output light LD output from the polarization beam splitter 192 near the relay lens 194. The relay lens 194 enlarges and outputs the output light LD entering from the multi-lens 193 toward the separation system 2.

Detection Unit

The detection unit 7 includes the zoom position detection section 71 detecting the zoom position based on the projection distance and the output section 72 outputting the F-number corresponding to the zoom position detected by the zoom position detection section 71 from F-number information corresponding to zoom positions stored in the memory unit 9.

Memory Unit

In the memory unit 9, the F-numbers corresponding to the zoom positions based on the projection distances and gradation information of the first light modulation element 31 corresponding to the F-numbers are stored. In the embodiment, the control unit 8 controls the gradation of the first light modulation element 31 based on the gradation information of the first light modulation element 31 corresponding to the F-number.

Control Unit

The control unit 8 includes the light source drive section 81 controlling the output light output from the light source unit 1, the display drive section 82 operating the light modulation elements 3, and the output section 72.

The light source drive section 81 controls the output light LD output from the light emitting section 111 based on an external image signal such as a video signal. The display drive section 82 operates the light modulation elements 3 based on an external image signal such as a video signal. Further, the display drive section 82 corrects white balance of the projection image on the screen S based on the F-number output by the output section 72. More specifically, the display drive section 82 controls the gradation of the first light modulation element 31 based on the gradation information of the first light modulation element 31 corresponding to the F-number output by the output section 72 from the gradation information of the first light modulation element 31 corresponding to the F-numbers stored in the memory unit 9, and thereby, controls the amount of the light output from the first light modulation element 31. As a result, the amount of the light output from the first light modulation element 31 is appropriately controlled based on the F-number, and thereby, the white balance of the projection image on the screen S is appropriately corrected based on the F-number of the projection system 6.

Functions and Effects

According to the projector 100A of the embodiment, the display drive section 82 controls the gradation of the first light modulation element 31 based on the gradation information of the first light modulation element 31 corresponding to the F-number output by the output section 72 from the gradation information of the first light modulation element 31 corresponding to the F-numbers stored in the memory unit 9, and thereby, controls the amount of the light output from the first light modulation element 31. Thereby, the display drive section 82 can correct the white balance of the projection image on the screen S. As a result, the projector 100A may project the projection image with the desired white balance on the screen S.

Note that, in the embodiment, the display drive section 82 controls only the gradation of the first light modulation element 31 based on the F-number detected by the detection unit 7, however, the display drive section 82 may control the gradations of the third light modulation element 32 and the fourth light modulation element 33. In this case, in the memory unit 9, information of the F-numbers corresponding to the zoom positions based on the projection distances and the gradations of the first light modulation element 31, the third light modulation element 32, and the fourth light modulation element 33 corresponding to the F-numbers is respectively stored. The display drive section 82 controls the gradations of the respective light modulation elements 3 based on the gradation information of the respective light modulation elements 3 corresponding to the F-numbers output by the output section 72 from the gradation information of the respective light modulation elements 3 corresponding to the F-numbers stored in the memory unit 9, and thereby, respectively adjusts the amounts of the lights output from the respective light modulation elements 3. Thereby, the display drive section 82 can correct the white balance of the projection image on the screen S.

Embodiment 3

Figure 5:
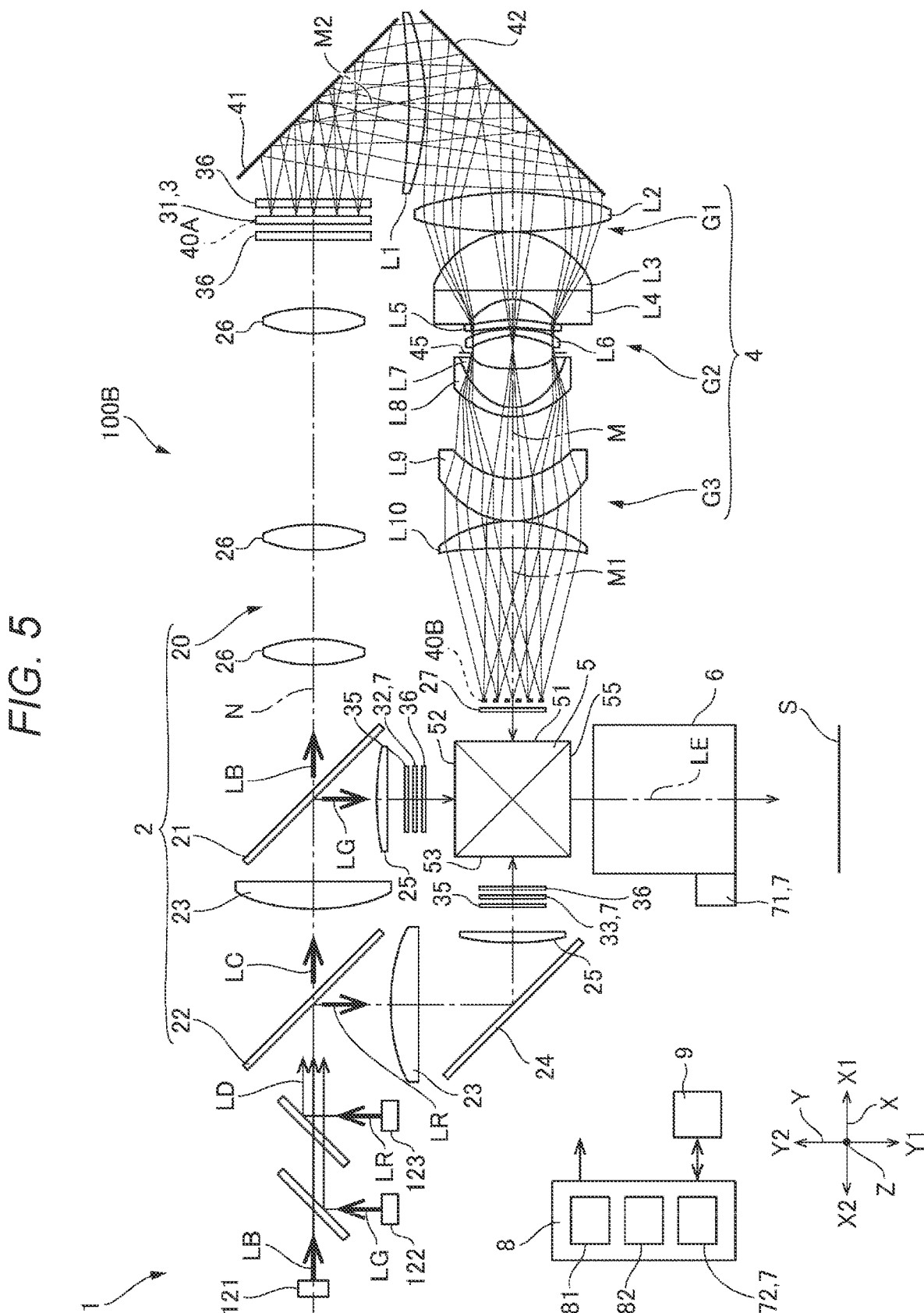
FIG. 5 is a schematic diagram of a main part of a projector of Embodiment 3.

FIG. 5 is a schematic diagram of a main part of a projector 100B of Embodiment 3. The projector 100B of Embodiment 3 is different from the projector 100 of Embodiment 1 in the configurations of the light source unit 1 and the control unit 8. Accordingly, in Embodiment 3, the same configurations as those of Embodiment 1 have the same signs and the explanation thereof may be omitted.

The light source unit 1 outputs the output light LD containing a first color light and another color light having a longer wavelength range than the first color light. As shown in FIG. 5, the light source unit 1 includes a first light emitting section 121, a second light emitting section 122, a third light emitting section 123, a first dichroic mirror 124, and a second dichroic mirror 125. The first light emitting section 121, the first dichroic mirror 124, and the second dichroic mirror 125 are sequentially arranged toward the first direction X1.

The first light emitting section 121 is placed in the second direction X2 of the first dichroic mirror 124. The first light emitting section 121 outputs a first color light LB having a first wavelength range containing a blue light toward the first dichroic mirror 124. The first light emitting section 121 is e.g., a blue light emitting diode outputting a blue light. The second light emitting section 122 is placed in the third direction Y1 of the first dichroic mirror 124. The second light emitting section 122 outputs a second color light LG having a second wavelength range containing a green light in the third direction Y1 of the first dichroic mirror 124. The second light emitting section 122 is e.g., a green light emitting diode outputting a green light. The third light emitting section 123 outputs a third color light LR having a third wavelength range containing a red light in the third direction Y1 of the second dichroic mirror 125. The third light emitting section 123 is e.g., a red light emitting diode outputting a red light. Here, the first light emitting section 121 corresponds to "first light source" of the present disclosure and the second light emitting section 122 and the third light emitting section 123 correspond to "second light source" of the present disclosure.

The first dichroic mirror 124 transmits the first color light LB and reflects the second color light LG and outputs a light formed by combining the first color light LB and the second color light LG. The second dichroic mirror 125 transmits the first color light LB and the second color light LG and reflects the third color light LR and outputs the output light LD formed by combining the first color light LB, the second color light LG, and the third color light LR. The output light LD is a white light. Here, the first wavelength range is e.g., from 420 nm to 500 nm. The second wavelength range is e.g., from 500 nm to 600 nm. The third wavelength range is e.g., from 600 nm to 680 nm.

Detection Unit

The detection unit 7 includes the zoom position detection section 71 detecting the zoom position based on the projection distance and the output section 72 outputting the F-number corresponding to the zoom position detected by the zoom position detection section 71 from F-number information corresponding to zoom positions stored in the memory unit 9.

Memory Unit

In the memory unit 9, information of the F-numbers corresponding to the zoom positions based on the projection distances and the amounts of lights of the first light emitting section 121 corresponding to the F-numbers is stored. In the embodiment, the control unit 8 controls the amount of light of the first light emitting section 121 based on the information of the amount of the light of the first light emitting section 121 corresponding to the F-number information.

Control Unit

The control unit 8 includes the light source drive section 81 controlling the output light LD output from the light source unit 1, the display drive section 82 operating the light modulation elements 3, and the output section 72. The display drive section 82 operates the light modulation elements 3 based on an external image signal such as a video signal.

The light source drive section 81 controls the first light emitting section 121, the second light emitting section 122, and the third light emitting section 123 based on an external image signal such as a video signal. Further, the light source drive section 81 corrects the white balance of the projection image on the screen S based on the F-number output by the output section 72. More specifically, the light source drive section 81 controls the amount of the first color light LB output from the first light emitting section 121 based on the information of the amount of the light of the first light emitting section 121 corresponding to the F-number output by the output section 72 from the information of the amounts of lights of the emitting section 121 corresponding to the F-numbers stored in the memory unit 9, and thereby, controls the amount of the light output from the first light modulation element 31. As a result, the amount of the light output from the first light modulation element 31 is appropriately controlled based on the F-number, and thereby, the white balance of the projection image on the screen S is appropriately corrected based on the F-number of the projection system 6.

Functions and Effects

According to the projector 100B of the embodiment, the light source drive section 81 controls the amount of the first color light LB output from the first light emitting section 121 based on the information of the amount of the light of the first light emitting section 121 corresponding to the F-number output by the output section 72 from the information of the amounts of lights of the emitting section 121 corresponding to the F-numbers stored in the memory unit 9, and thereby, controls the amount of the light output from the first light modulation element 31. Thereby, the light source drive section 81 can correct the white balance of the projection image on the screen S. As a result, the projector 100B may project the projection image with the desired white balance on the screen S.

Note that, in the embodiment, the light source drive section 81 controls only the amount of the first color light LB output from the first light emitting section 121 based on the F-number detected by the detection unit 7, however, the light source drive section 81 may control the amounts of the other color lights output from the second light emitting section 122 and the third light emitting section 123. In this case, in the memory unit 9, information of the F-numbers corresponding to the zoom positions based on the projection distances and the amounts of the lights of the first light emitting section 121, the second light emitting section 122, and the third light emitting section 123 corresponding to the F-numbers is respectively stored. The light source drive section 81 controls the amounts of the lights of the respective light emitting sections based on the information of the amounts of the lights of the respective light emitting sections corresponding to the F-numbers output by the output section 72 from the information of the amounts of the lights of the respective light emitting sections corresponding to the F-numbers stored in the memory unit 9, and thereby, respectively controls the amounts of the lights output from the respective light modulation elements 3. Thereby, the light source drive section 81 may correct the white balance of the projection image on the screen S.

Other Embodiments

In the above described embodiments, the first color light has the first wavelength range containing the blue light, however, not limited to that. For example, the first color light may have the second wavelength range containing the green light and the second color light may have the first wavelength range containing the blue light. In this case, the first light modulation element 31 modulates the first color light having the second wavelength range containing the green light and the third light modulation element 32 modulates the second color light having the first wavelength range containing the blue light.

In the projectors of the above described embodiments, the projection system 6 may be a detachable and replaceable optical system. In this case, the projection system 6 may be a prime lens, not the zoom lens. When the projection system 6 is a prime lens, the detection unit 7 may detect the F-number of the attached projection system 6. As a method of detecting the F-number, for example, a chip with the F-number recorded therein may be provided in the projection system 6 and the detection unit 7 may detect information of the F-number stored in the chip. Or, a unique shape based on the F-number may be formed in the projection system 6 and the detection unit 7 may detect the F-number from the shape.

Figure 6:
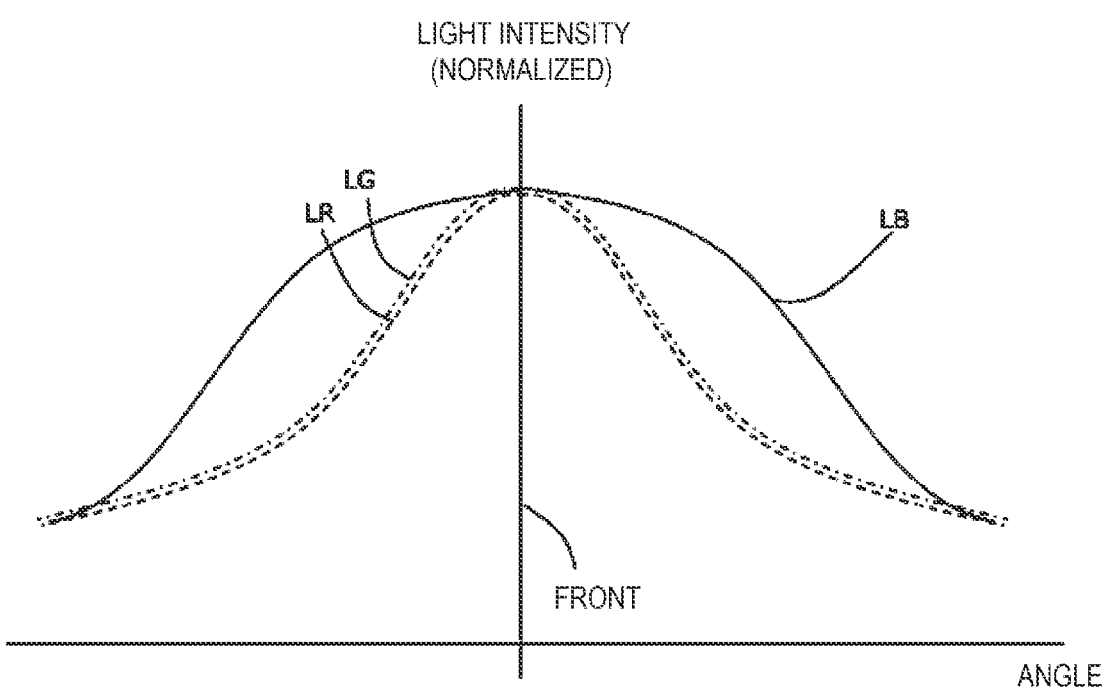
FIG. 6 shows another example of light intensity distributions of the first color light, the second color light, and the third color light entering the light combining prism.

In the above described embodiments, differences by influences of diffraction lights due to differences of dimensions of pixel pitches in the light modulation elements are focused. As another embodiment, for example, depending the design factor of the relay system 4 or the like, the intensity distributions as shown in FIG. 6 may be obtained. Even in this case, the white balance of the projection image on the projection surface may be appropriately corrected based on the technical ideas of the above described embodiments.

SUMMARY OF PRESENT DISCLOSURE

As below, the summary of the present disclosure will be appended.

APPENDIX 1

A projector includes a light source unit outputting an output light containing a first color light and another color light having a longer wavelength range than the first color light, a first light modulation element irradiated with the first color light and modulating the first color light, a second light modulation element irradiated with the other color light and modulating the other color light, a relay system, with the first light modulation element placed on an enlargement-side imaging surface, reducing a luminous flux width of the first color light modulated by the first light modulation element on a reduction-side imaging surface, a light combining prism outputting a combined light formed by combining the first color light having the luminous flux width reduced by the relay system and the other color light modulated by the second light modulation element, a projection system projecting the combined light output from the light combining prism as a projection image, a detection unit detecting an F-number of the projection system, and a control unit correcting a white balance of the projection image by controlling an amount of a light output from at least one of the first light modulation element and the second light modulation element based on the F-number detected by the detection unit, wherein an effective area of the first light modulation element is larger than an effective area of the second light modulation element, and a pixel pitch of the first light modulation element is larger than a pixel pitch of the second light modulation element.

Thereby, even when the effective area of the first light modulation element is larger than the effective area of the second light modulation element and the pixel pitch of the first light modulation element is larger than the pixel pitch of the second light modulation element, the projector may correct the white balance of the projection image by controlling the amount of the light output from at least one of the first light modulation element and the second light modulation element based on the F-number of the projection system.

APPENDIX 2

In the projector according to Appendix 1, the light source unit includes a light emitting element outputting the first color light in a first polarization state, a wave plate converting a part of the first color light output from the light emitting element into a second polarization state, a polarization separation element respectively separating the first color light in the first polarization state and the first color light in the second polarization state, a phosphor element converting the first color light in the first polarization state separated by the polarization separation element into the other color light and reflecting the other color light, a diffusion element diffusing the first color light in the second polarization state separated by the polarization separation element, and a combining element combining the first color light reflected by the diffusion element and the other color light reflected by the phosphor element to form the output light, and the control unit controls amounts of lights output from the first light modulation element and the second light modulation element by controlling an angle of the wave plate.

Thereby, the control unit controls the amounts of the lights output from the first light modulation element and the second light modulation element by controlling the angle of the wave plate to adjust the ratio of the amounts of the first color light and the other color light contained in the output light. As a result, the projector may correct the white balance of the projection image on a projection surface based on the F-number of the projection system.

APPENDIX 3

In the projector according to Appendix 1, the control unit controls the amount of the light output from at least one of the first light modulation element and the second light modulation element by controlling a gradation of the at least one of the first light modulation element and the second light modulation element.

Thereby, the projector may correct the white balance of the projection image based on the F-number of the projection system.

APPENDIX 4

In the projector according to Appendix 1, the light source unit includes a first light source outputting the first color light and a second light source outputting the other color light, and the control unit controls the amount of the light output from at least one of the first light modulation element and the second light modulation element by controlling an amount of a light of at least one of the first light source and the second light source.

Thereby, the projector may correct the white balance of the projection image based on the F-number of the projection system.

APPENDIX 5

In the projector according to any one of Appendices 1 to 4, the first color light has a first wavelength range containing a blue light.

APPENDIX 6

In the projector according to Appendix 5, the other color light includes a second color light having a longer wavelength range than the first color light and a third color light having a longer wavelength range than the first color light and the second color light, the second light modulation element includes a third light modulation element irradiated with the second color light and modulating the second color light and a fourth light modulation element irradiated with the third color light and modulating the third color light, the effective area of the first light modulation element is larger than effective areas of the third light modulation element and the fourth light modulation element, and the pixel pitch of the first light modulation element is larger than pixel pitches of the third light modulation element and the fourth light modulation element.

Thereby, the projector may project a combined light formed by combination of a plurality of color lights.

APPENDIX 7

In the projector according to Appendix 6, the second color light has a second wavelength range containing a green light, and the third color light has a third wavelength range containing a red light.

Thereby, the projector may project a full-color combined light.

APPENDIX 8

In the projector according to any one of Appendices 1 to 7, the projection system is a zoom lens, and the detection unit detects the F-number based on a projection distance of the projection system.

Thereby, even when the projection distance of the projection system is changed, the projector may appropriately correct the white balance of the projection image based on the F-number of the projection system.

What is claimed is:

1. A projector comprising:
   a light source unit outputting an output light containing a first color light and another color light having a longer wavelength range than the first color light;
   a first light modulation element irradiated with the first color light and modulating the first color light;
   a second light modulation element irradiated with the other color light and modulating the other color light;
   a relay system, with the first light modulation element placed on an enlargement-side imaging surface, reducing a luminous flux width of the first color light modulated by the first light modulation element on a reduction-side imaging surface;
   a light combining prism outputting a combined light formed by combining the first color light having the luminous flux width reduced by the relay system and the other color light modulated by the second light modulation element;
   a projection system projecting the combined light output from the light combining prism as a projection image;

a detection unit detecting an F-number of the projection system; and a control unit correcting a white balance of the projection image by controlling an amount of a light output from at least one of the first light modulation element and the second light modulation element based on the F-number detected by the detection unit, wherein an effective area of the first light modulation element is larger than an effective area of the second light modulation element, and a pixel pitch of the first light modulation element is larger than a pixel pitch of the second light modulation element.

2. The projector according to claim 1, wherein the light source unit includes a light emitting element outputting the first color light in a first polarization state, a wave plate converting a part of the first color light output from the light emitting element into a second polarization state, a polarization separation element respectively separating the first color light in the first polarization state and the first color light in the second polarization state, a phosphor element converting the first color light in the first polarization state separated by the polarization separation element into the other color light and reflecting the other color light, a diffusion element reflecting the first color light in the second polarization state separated by the polarization separation element, and a combining element combining the first color light reflected by the diffusion element and the other color light reflected by the phosphor element to form the output light, and the control unit controls amounts of lights output from the first light modulation element and the second light modulation element by controlling an angle of the wave plate.

3. The projector according to claim 1, wherein the control unit controls the amount of the light output from at least one of the first light modulation element and the second light modulation element by controlling a gradation of the at least one of the first light modulation element and the second light modulation element.

4. The projector according to claim 1, wherein the light source unit includes a first light source outputting the first color light and a second light source outputting the other color light, and the control unit controls the amount of the light output from at least one of the first light modulation element and the second light modulation element by controlling an amount of a light of at least one of the first light source and the second light source.

5. The projector according to claim 1, wherein the first color light has a first wavelength range containing a blue light.

6. The projector according to claim 5, wherein the other color light includes a second color light having a longer wavelength range than the first color light and a third color light having a longer wavelength range than the first color light and the second color light, the second light modulation element includes a third light modulation element irradiated with the second color light and modulating the second color light and a fourth light modulation element irradiated with the third color light and modulating the third color light, the effective area of the first light modulation element is larger than effective areas of the third light modulation element and the fourth light modulation element, and the pixel pitch of the first light modulation element is larger than pixel pitches of the third light modulation element and the fourth light modulation element.

7. The projector according to claim 6, wherein the second color light has a second wavelength range containing a green light, and the third color light has a third wavelength range containing a red light.

8. The projector according to claim 1, wherein the projection system is a zoom lens, and the detection unit detects the F-number based on a projection distance of the projection system.

* * * * *